United States Patent [19]

Silvy et al.

[11] E Patent Number: Re. 32,937

[45] Reissued Date of Patent: May 30, 1989

[54] MODULATION SYSTEM FOR OPTICAL RECORDING

[75] Inventors: Dorrel R. Silvy, Elbert; William J. Stanis, Colorado Springs, both of Colo.

[73] Assignee: Magnetic Peripherals, Inc., Minneapolis, Minn.

[21] Appl. No.: 878,866

[22] Filed: Jun. 26, 1986 (Under 37 CFR 1.47)

Related U.S. Patent Documents

Reissue of:

[64] Patent No.: 4,456,981
Issued: Jun. 26, 1984
Appl. No.: 359,642
Filed: Mar. 19, 1982

[51] Int. Cl.[4] ..... G11B 7/00; G11B 21/10

[52] U.S. Cl. ..... 365/234; 369/111; 369/275; 360/77.07; 358/342; 365/215

[58] Field of Search ..... 369/111, 275, 44, 45, 369/46; 346/76 L, 108; 365/234, 215; 360/77; 358/342

[56] References Cited

U.S. PATENT DOCUMENTS

| | | | |
|---|---|---|---|
| 3,795,902 | 3/1974 | Russell | 369/48 |
| 4,094,010 | 6/1978 | Pepperl et al. | 365/215 |
| 4,094,013 | 6/1978 | Hill et al. | 365/234 |
| 4,238,843 | 12/1980 | Carasso et al. | 365/234 |
| 4,325,135 | 4/1982 | Dil et al. | 369/275 X |
| 4,326,282 | 4/1982 | Verboom et al. | 369/48 |
| 4,366,564 | 12/1982 | de Haan et al. | 369/48 |
| 4,402,061 | 8/1983 | Hazel et al. | 369/46 X |
| 4,428,069 | 1/1984 | Hazel et al. | 365/215 |
| 4,428,075 | 1/1984 | Hazel et al. | 369/45 |
| 4,486,791 | 12/1984 | Wada et al. | 358/342 |
| 4,488,187 | 12/1984 | Alaimo | 360/77 |
| 4,564,929 | 1/1986 | Yonezawa et al. | 369/44 |

FOREIGN PATENT DOCUMENTS

| | | |
|---|---|---|
| 0021411 | 1/1981 | European Pat. Off. . |
| 2016744 | 9/1979 | United Kingdom . |

OTHER PUBLICATIONS

Patents Abstracts of Japan, vol. 5, No. 73, p. 61 [745], May 15, 1981, Denki k.k.

Patents Abstracts of Japan, vol. 4, No. 168, p. 37 [650], Nov. 20, 1980, Seisakusho, k.k.

*Primary Examiner*—Joseph A. Popek

*Attorney, Agent, or Firm*—Edward P. Heller, III; Robert M. Angus; Joseph A. Genovese

[57] ABSTRACT

In an optical recording system, a media disk for writing information has a plurality of information tracks with preformatted clock location indications written on the tracks. Writing is accomplished by making a written indication at a predetermined location between preformatted clock locations where the predetermined location is representative of the particular data to be written. Proper location of the preformatted clock location indicia on adjacent tracks provides for proper track crossing information when track addressing occurs as well as proper address location on particular tracks.

14 Claims, 3 Drawing Sheets

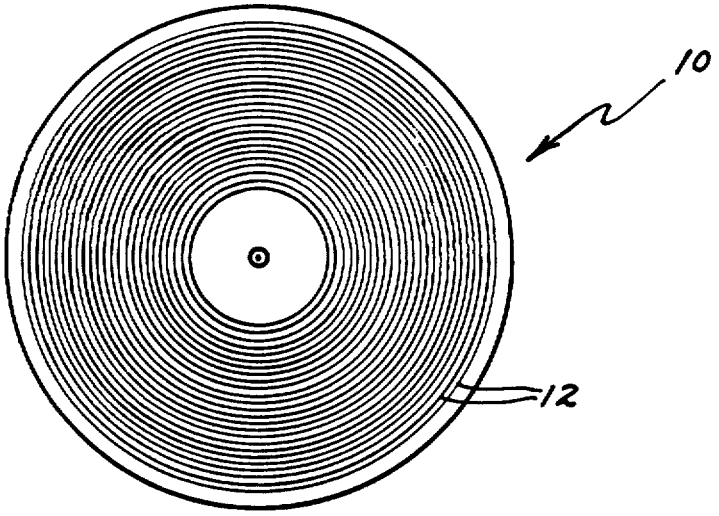
FIG. 1
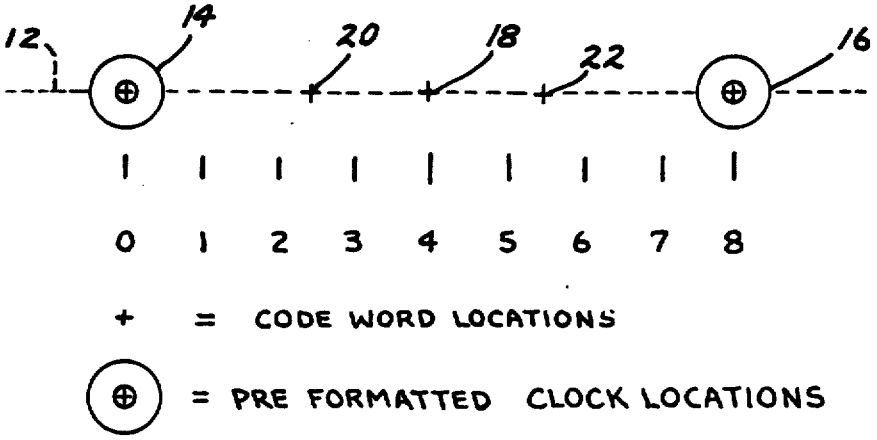
FIG. 2
| MODULATION CODE | | | BINARY |
|---|---|---|---|
| 0 0 0 | OR | 0 0 0 | 0 0 |
| 0 0 1 | | 1 0 0 | 0 1 |
| 0 1 0 | | 0 1 0 | 1 0 |
| 1 0 0 | | 0 0 1 | 1 1 |
FIG. 3

MODULATION SYSTEM FOR OPTICAL RECORDING

Matter enclosed in heavy brackets [ ] appears in the original patent but forms no part of this reissue specification; matter printed in italics indicates the additions made by reissue.

BACKGROUND OF THE INVENTION

This invention relates to optical recording systems. In particular, this invention relates to modulation and encoding of optical disk media for both reading and writing information in optical recording systems. The modulation and coding system of the present invention provides both clocking and track addressing information.

Known in the prior art, in U.S. Pat. No. 4,238,843 showing a disk-shaped optical record carrier medium having spiral information tracks where a plurality of sectors are divided into a data or information section and a synchronizing section. Each synchronizing section has a prerecorded indicator portion and an address portion. The indicator portion is used to identify the beginning of the sector and also the address portion of the sector. The indicator portion has information recorded thereon so that the signal produced has a frequency domain which is clearly distinguishable from any information component resulting in the address portion or the data portion of the record carrier.

The present invention does not make use of a frequency distinguishable signal for presentation of data information as described in the patent. Instead, the present invention provides a preformatted modulation scheme, using concentric information tracks, for all information including sector, address and data information which may be written using the preformatted clock locations. In addition, the clock locations on the concentric tracks may be varied in a predetermined fashion to be on one side or the other side of the center of the track so that track crossing information can be obtained as a result of detecting different signals resulting from adjacent tracks. This feature is of course primarily susceptible to use in a concentric track record carrier medium, although, the use of concentric information tracks, standing alone, is certainly old in the recording art in general.

SUMMARY OF THE INVENTION

The present invention provides for a preformatted record carrier in optical recording having preformatted clock locations on concentric information tracks which can be used to provide clocking and track crossing information. The present invention includes a modulation system which has particular utility for a writing system in optical recording.

The optical recording disk according to the present invention has a plurality of prewritten spaced apart clock locations indicated in the recording medium. The recording medium is designed so that it may be written on by individual units in a writing and reading system. Writing is accomplished by writing at a particular location between individual spaced apart clock locations. The particular location of the writing between clock locations conveys the information desired. In this way, for example, the non-writing or writing of a single location between two predetermined clock locations in one of three possible positions can be used to distinguish between four possible items of information. Many combinations of locations and the order of significance of the locations are possible within the scope of the invention. Further, by writing the preformatted clock location bit on one side of the center of the information track or the other, in various combinations, track crossing information can be presented to the system to aid in track addressing procedures when shifted from one concentric information track to another.

IN THE FIGURES

FIG. 1 shows a top plan view of record carrier media disk for optical recording according to the present invention.

FIG. 2 shows a preformatted clock location system according to the present invention for the record carrier of FIG. 1.

FIG. 3 shows a possible modulation code for use with the system according to the present invention as shown in FIG. 2.

DESCRIPTION OF THE PREFERRED EMBODIMENT

Figure 4:
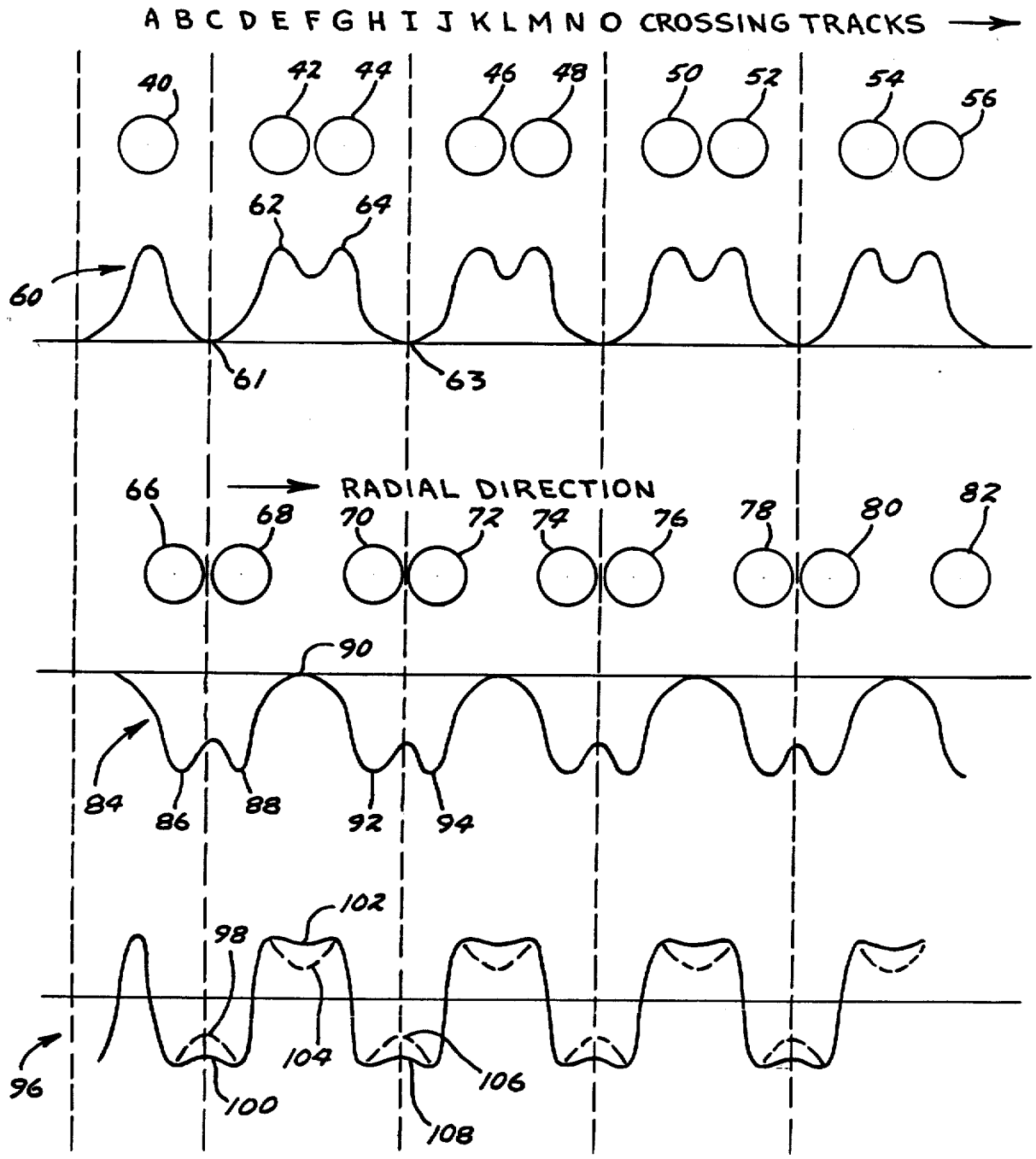
FIG. 4 shows the derivation of track crossing information in a record carrier according to the present invention.

Referring now to FIG. 1, a record carrier media disk 10 according to the present invention is provided with a plurality of concentric information tracks 12. These information tracks 12 are preformatted in accordance with the present invention so that a disk containing the preformatted clock information may be provided as a "blank" for an optical recording system in which both writing and reading will occur. In addition, the clock system according to the present invention may be used in a preformatted prewritten recording carrier medium for use with an optical recording device in which only reading of information may occur. The use of concentric information tracks 12 is particularly suitable for a system in which it is desired to randomly access particular information bits as is customary in a data handling system, for example.

Referring now to FIG. 2, which illustrates a short track segment, each of the concentric information tracks 12 has a plurality of prewritten, preformatted clock locations, shown symbolically, as locations 14 and 16. Each information track 12 has the various clock locations prewritten at a predetermined distance apart. As shown by the scale in FIG. 2, the clock locations in this embodiment are spaced apart a distance that may be subdivided into 8 smaller intervals. According to a preferred embodiment of the invention, data may be written by writing, using the principles of the optical recording technology, a single location at one of three predetermined possible locations between the clock locations 14 and 16. One of the three predetermined code word locations is at 18, representing 4 on the subdivision scale and exactly between the clock locations 14 and 16. The other two locations for writing code words are at location 20, midway on the scale between two and three and at 22, midway on the scale between 5 and 6. Other embodiments of the invention may exist in which the predetermined number of possible code word locations is 3 but, in which, the code word locations would be exactly 2, 4 and 6. Further embodiments of the invention exist in which more than 3 possible code word locations may exist between clock locations. The number of possible code word locations would be related to the binary number system in a logical way. Thus, between two clock locations there may be no code word written at all or only one code word written in one location. Depending on the location of the code word which is written, different meanings are assigned. The most significant bit can be at either end of the interval between clock locations depending upon the embodiment. The proposed embodiments according to the present invention do not contemplate writing more than one code word between clock locations, although the scope of the invention is not so limited.

FIG. 3 shows the modulation code and the binary values assigned to particular modulation codes in two alternative formats. In the modulation code column, the symbols represent the presence or absence of a data bit at a position location represented by 0's and 1's equivalent to the three code word locations existing between the clock locations as shown in FIG. 2. The binary values shown in the binary column represent the binary values assigned to particular modulation codes. It is significant that the absence of any writing between the clock locations does represent a binary value. That is because the duty cycle of the write laser in optical recording is a critical factor and, therefore, any factor which improves the duty cycle is important. Thus, the absence of a written item between clock locations helps the laser duty cycle.

Referring now to FIG. 4, the track crossing information retrieval system as related to the present invention is shown symbolically. The left to right direction of FIG. 4 represents the radial direction of an information record carrier disk 10 as shown in FIG. 1. The vertical direction on FIG. 4 represents the tangential direction with respect to individual data tracks 12 on the record carrier disk 10. Thus, traversing the record carrier, radially, a plurality of prewritten clock locations 40, 42, 44, 46, 48, 50, 52, 54 and 56 are found, each associated with a different concentric information track, respectively. Similarly, the corresponding clock location for the pairs of clock locations on different concentric information tracks are represented at 66, 68, 70, 72, 74, 76, 78, 80 and 82, respectively.

Guard bands between tracks exist in the vertical direction of the drawing as shown by the letters C, I and O. The center of a track may be taken as being in a vertical orientation with the letter A. Thus, clock location 40 may be written on the track center line while the second clock location may be written off the center line to one direction as at B or, alternatively it could be written off the center line to the other direction. The clock locations could also be all written on the center line of the information track. Similarly, a track center line may be taken as a line between D and E in the vertical direction with both clock locations 42 and 68 written off the center line, however, in different directions radially. *It is to be noted that the zero crossing of summation waveform 96 occurs at the track center between D and E. This tracking information may be used by servo systems to track the track center line.* In any event, for a read head mechanism to be crossing tracks in the radial direction, a pattern of clock locations, which may be paired as being close together, separated by a space can be identified.

The read signal detecting these clock locations may be represented by a read signal curve 60 having a null at 61 and a twin detecting peaks at 62 and 64 and another null at 63 representing the pattern of clock locations traversed. Further, because the clock locations 66 through 80 are paired in the opposite pattern another curve 84 is formed having twin detecting peaks at 86 and 88 and a null at 90 while another pair of detecting peaks at 92 and 94 is formed. Because the record carrier is assumed to be turning at the same time that the reading head element is traversing the tracks, a composite pattern will be formed while traversing clock signals on various tracks. This composite signal comprised of crossing tracks having the clock locations alternated in a pattern as shown will produce a net output read signal curve 96 having flattened peaks at 100, 102 and 108 which represents the summation of the individual curves 60 and 84. The flattened peaks at 100, 102 and 108 represent the twin detecting peaks of curves 60 and 84 as modified by the null value of the offsetting curve. In effect, what is generated is somewhat similar to a square wave and it is possible to count track crossings and numbers of tracks using a wave of the wave shape of the form shown at 96. Thus, using the system of the present invention provides a method by which track crossing may be counted using preformatted clock signals. The data as written according to a code shown in FIG. 3 provides insufficient additional detecting values to interfere significantly with the detecting curve for clock signals shown at 96 because the data occurs at sufficiently random places on the data tracks and, in effect, represents a noise value which is not seen in the track crossing mode. Thus, the present invention has the advantage that there is a minimum interaction of data and tracking information in the track crossing mode.

Figure 5:
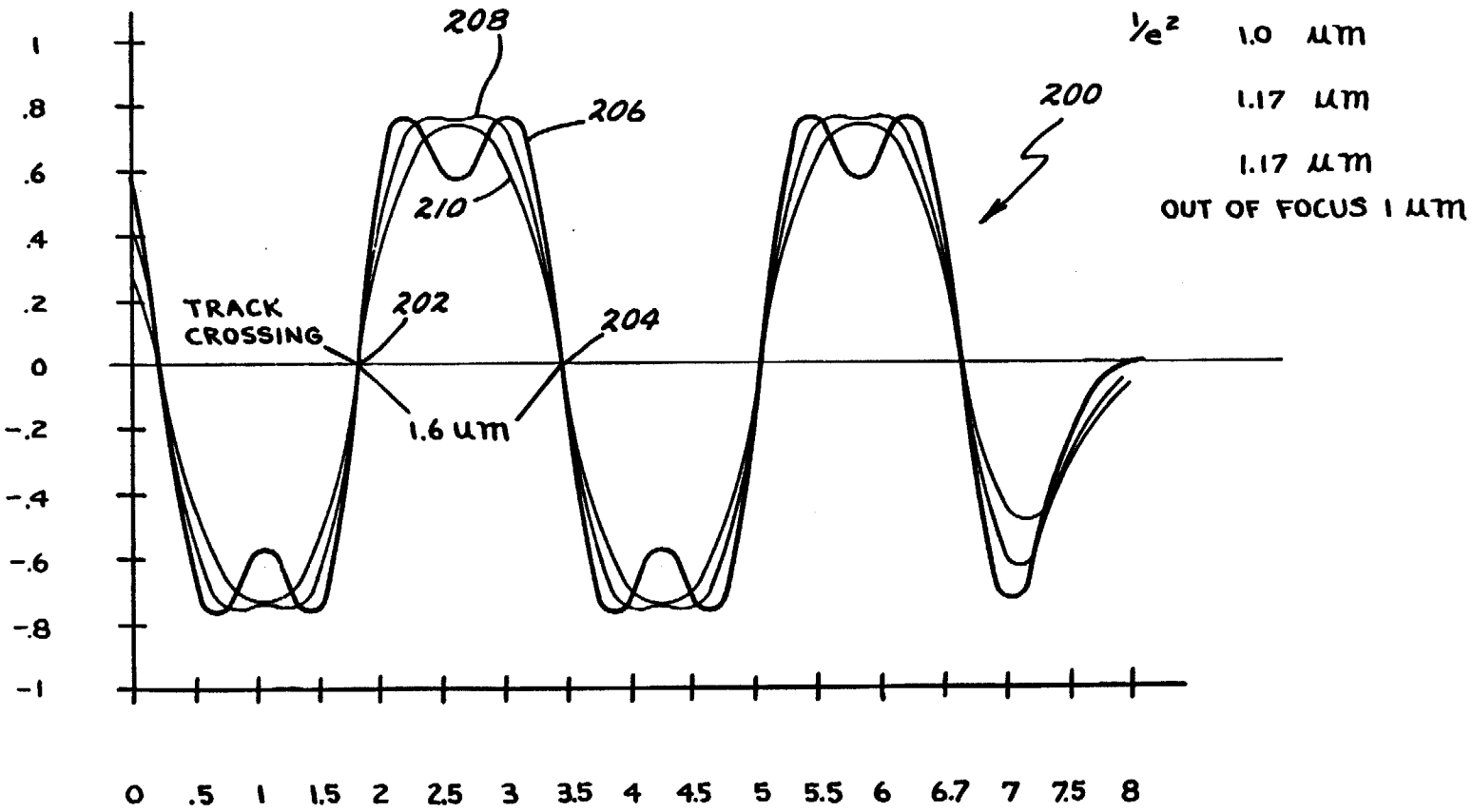
FIG. 5 shows a detail of a track crossing information signal using the system according to the present invention.

Referring now to FIG. 5, a detailed showing of a curve 206 representative of the type of curve found in FIG. 4 at 96 is shown. It is assumed for the purposes of FIG. 5 that concentric tracks 12 are spaced radially apart a distance of 1.6 micrometers. Track crossings are therefore shown on intervals at 202 and 204 for the curve shown generally at 200. The curve consists of three separate components which represent curves 208 and 210 added together to form a net resulting curve 206 representative of the track crossing signal as detected. *Also, the twin peaks of the net resulting curve 206 between the zero-valued track crossings occur approximately halfway between track crossings and are indicative of a track center line which may be used by a servo system to track the center line.*

It is anticipated that, using the present invention, where a disk might be turning in the vicinity of 8 to 10 revolutions per second and where the track crossing rate might be in the range of 25 to 40 centimeters per second, several clock locations will pass under the read head during the time that the read head is crossing each track. Thus, the track crossing information signal would read several clock locations per track during the crossing movement, all of which would be averaged using appropriate electronic circuitry having the appropriate time constant to average this track crossing information. Also, as a result of this track crossing rate, the clock locations need not be alternated at each clock location but many clock locations may be written on each side of the center of the information track before switching to the other side and still achieve the desired average track crossing signal which represents an approximation of a square or pulse wave which provides track crossing information as well as track count information. Using the clock locations spaced apart approximately 2 micrometers with the concentric tracks spaced apart approximately 1.6 micrometers, it is possible to obtain approximately 1,000M bytes capacity on a 30 centimeter disk where an appropriate data rate may be obtained with approximately 8 revolutions per second. Looking at this another way, track density may be on the order of 15,000 to 20,000 tracks per inch.

The present invention provides clock information for control of an optical recording system during both the data write and data read cycles. A preformatted record media disk may be provided with clock locations already indicated thereon for a data recording system. For a data reading system, only, both data and clock locations may be prewritten. Using clock locations in an appropriate pattern displaced from track centers to create a track crossing signal, tracking information for the tracking servo and track addressing may be obtained. The track crossing information may be used for coarse positioning of the read and write head with a reasonable access time using this track counting system.

In the data write operation, the amount and duration of time that the write laser beam must be activated represents the laser duty cycle. The duty cycle using preformatted clock locations according to the present invention is advantageous because the duty cycle is sufficiently short so as to prolong laser lifetime. Reliability of the data system according to present invention is comparatively high because the ratio of data bits per clock cycle is sufficiently low. In systems relying on a high number of data bits per clock cycle, the reliability tends to decrease. Therefore, the present invention has a comparatively high reliability. Similarly, there is comparatively little signal interaction of the data and tracking information using the preformatted clock locations according to the present invention, in the track crossing mode. In some systems, interference between the tracking signal and the data or information signal can be a problem and this is avoided in the present invention.

What is claimed is:

1. A disk shaped record carrier for optical recording comprised of:

a plurality of concentric information tracks each track having a track center line, each track having a plurality of preformatted clock locations prewritten into each of said concentric information tracks at equally spaced intervals, the record carrier having said preformatted clock locations placed on adjacent concentric information tracks in a predetermined pattern of locations away from the track center line and within a guard band separating tracks to have the concentric tracks present a radial pattern indicative of track crossing patterns as a result of the predetermined pattern of off-center clock locations, said record carrier being adapted to record information using a selected one or none of a predetermined plurality of possible writing locations between each pair of clock locations, where the particular location between clock locations is representative of two binary data bits.

*2. A disk shaped carrier for optical recording comprised of:*

*a plurality of information tracks, each track having a track center line, each track having in at least one portion thereof a plurality of preformatted locations offset from said track center line in a predetermined pattern, said pattern including at least one preformatted location offset to one side of a track followed by at least one preformated location offset to the other side.*

*3. The disk shaped carrier of claim 2 wherein said tracks are concentric.*

*4. The disk shaped carrier of claim 2 wherein said locations lie within the guard band between tracks.*

*5. A disk shaped carrier for optical recording comprised of:*

*a plurality of information tracks, each track having a track center line, each track having in at least one portion thereof a plurality of preformated locations offset from track center in a predetermined pattern which provides tracking information on reading thereof for the tracking servo.*

*6. Apparatus comprising:*

*a disk shaped carrier for optical recording;*

*a plurality of tracks for recording information on the disk, each track having a track center line on which data locations are recorded in at least a portion thereof; and*

*a plurality of discrete preformatted offset locations offset from said track center line in a predetermined pattern, the pattern including locations offset to one side of track center alternating with locations offset to the other side, the offset locations placed in a pair of lines parallel to the track center line and offset one each on opposite sides of the track center line.*

*7. Apparatus according to claim 5 in which data locations are recorded on the track center line only between preformatted offset locations.*

*8. Apparatus according to claim 7 wherein said preformatted offset locations are located on the disk in an area separate from any data location.*

*9. Apparatus according to claim 7 wherein those preformatted offset locations of adjacent tracks which are offset to the side closest to the adjacent tracks are placed radially adjacent one another.*

*10. Apparatus according to claim 5 wherein said preformatted offset locations lie in guard bands between tracks.*

*11. Apparatus according to claim 6 wherein those preformatted offset locations of adjacent tracks which are offset to the side closest to the adjacent track are placed radially adjacent one another.*

*12. Apparatus according to claim 5 wherein those preformatted offset locations of adjacent tracks which are offset to the side closest to the adjacent tracks are placed radially adjacent one another.*

*13. Apparatus according to claim 5 in which a plurality of preformatted offset locations offset to one side are followed by a plurality of preformatted locations offset to the other side of the track center.*

*14. A disk shaped carrier for optical recording comprised of:*

*a plurality of tracks, each track having a track center line on which data locations are recorded in at least one portion thereof; and*

*a plurality of discrete offset locations offset to both sides of the track center line in a predetermined pattern which provides tracking information on the reading thereof.*

* * * * *

UNITED STATES PATENT AND TRADEMARK OFFICE

CERTIFICATE OF CORRECTION

PATENT NO. : RE 32,937

DATED : May 30, 1989

INVENTOR(S) : D. R. Silvy et al.

It is certified that error appears in the above-identified patent and that said Letters Patent is hereby corrected as shown below:

Column 6, line 32 (claim 7, line 1) for "5" read --6--

Column 6, line 42 (claim 10, line 1) for "5" read --6--

Column 6, line 44 (claim 11, line 1) for "6" read --10--

Column 6, line 48 (claim 12, line 1) for "5" read --6--

Column 6, line 52 (claim 13, line 1) for "5" read --6--

Signed and Sealed this

Thirteenth Day of February, 1990

*Attest:*

JEFFREY M. SAMUELS

*Attesting Officer* *Acting Commissioner of Patents and Trademarks*